United States Patent
Irwin et al.

(10) Patent No.: US 10,908,560 B2
(45) Date of Patent: Feb. 2, 2021

(54) VARIABLE RATE DAMPING BASED CONTROL SYSTEM FOR BACKDRIVEN CONTROL INPUT DEVICES

(71) Applicant: The Boeing Company, Chicago, IL (US)

(72) Inventors: Joseph G. Irwin, Landenberg, PA (US); Bryan C. Chu, Phoenix, AZ (US); Russell Enns, Chandler, AZ (US); Gary D. Klein, Mesa, AZ (US); Jon F. Lenander, Queen Creek, AZ (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 16/298,468

(22) Filed: Mar. 11, 2019

(65) Prior Publication Data
US 2020/0293004 A1   Sep. 17, 2020

(51) Int. Cl.
*G05B 13/02*   (2006.01)
*G05B 6/02*   (2006.01)
*G05B 1/01*   (2006.01)

(52) U.S. Cl.
CPC ............ *G05B 13/021* (2013.01); *G05B 1/01* (2013.01); *G05B 6/02* (2013.01); *G05B 2219/41004* (2013.01)

(58) Field of Classification Search
None
See application file for complete search history.

(56) References Cited

U.S. PATENT DOCUMENTS

| | | | | | |
|---|---|---|---|---|---|
| 4,078,749 | A | * | 3/1978 | Johnson, Jr. ......... | G05D 1/0061 244/17.13 |
| 6,189,836 | B1 | * | 2/2001 | Gold .................... | G05D 1/0816 244/17.13 |
| 2003/0106958 | A1 | * | 6/2003 | Gold .................... | G05D 1/0858 244/17.13 |
| 2009/0242691 | A1 | * | 10/2009 | Wittmer ................. | B64C 27/68 244/17.13 |

(Continued)

OTHER PUBLICATIONS

Aouf et al. 'Scheduling schemes for an integrated flight and propulsion control system' Control Engineering Practice 10 (2002) 685-696.*

*Primary Examiner* — Bernard G Lindsay

(57) ABSTRACT

A control system for a machine having variable rate damping based control (VRDC) is disclosed, and includes one or more processors and a memory coupled to the processors storing data comprising a database and program code that, when executed by the processors, causes the control system to receive an inceptor position from one or more active inceptors and calculate an operator command based on at least the inceptor position. The control system is caused to determine an amplitude of the operator command. The control system is caused to determine a variable gain based on the amplitude of the operator command and determines an actuation command based on the variable gain. The control system sends the inline actuators the actuation command. The inline actuators actuate into a total actuator position to variably damp movement of the machine as a function of the magnitude of the operator command.

25 Claims, 7 Drawing Sheets

(56) References Cited

U.S. PATENT DOCUMENTS

| | | | |
|---|---|---|---|
| 2009/0266940 A1* | 10/2009 | Miller | G05D 1/0607 244/223 |
| 2011/0168851 A1* | 7/2011 | Cherepinsky | G05D 1/0858 244/223 |
| 2013/0060406 A1* | 3/2013 | Christensen | G05D 1/0607 701/4 |
| 2014/0231591 A1* | 8/2014 | Higuchi | G05D 1/0858 244/175 |
| 2019/0155282 A1* | 5/2019 | Kim | B64C 13/503 |

* cited by examiner

VARIABLE RATE DAMPING BASED CONTROL SYSTEM FOR BACKDRIVEN CONTROL INPUT DEVICES

INTRODUCTION

The present disclosure relates to a control system having variable rate damping control. More particularly, the present disclosure relates to a control system for a machine, where the control system variably damps movement of the machine as a function of a magnitude of an operator command.

BACKGROUND

Some machines or mechanical apparatuses are equipped with control systems requiring human input to manage operation of moving components. For example, a trajectory of a vehicle is managed by operation of a variety of control input devices, which are referred to as inceptors, that are manipulated by a human operator. The inceptors may be actively driven to provide force based tactile cues to the human operator and provide backdrive capability, and may be referred to as active inceptors. Backdriving an inceptor provides a machine operator with an indication as to what the control system is doing to the machine and provides control inputs to maintain a particular machine state. In one example, inceptor that is backdriven assist a helicopter pilot in maintaining a particular course and/or heading. In another example, an inceptor that is backdriven assists the driver of a vehicle with maintaining a stable velocity while driving down-hill.

It is to be appreciated that when an operator utilizes an inceptor that is backdriven, the backdriven inceptor may inadvertently come into contact with the operator's limb. This unintentional contact by the operator's limb with the inceptor that is backdriven is received as input by the control system. Moreover, the unintentional contact by the operator may be amplified by the control system.

SUMMARY

In several aspects of the present disclosure, a control system for a machine having variable rate damping based control (VRDC) is disclosed. The machine includes one or more active inceptors and one or more inline actuators. The control system includes one or more processors and a memory coupled to the one or more processors. The memory stores data comprising a database and program code that, when executed by the one or more processors, causes the control system to receive an inceptor position from one or more active inceptors. The control system is also caused to calculate an operator command based on at least the inceptor position. The control system is further caused to determine an amplitude of the operator command, where the amplitude is a magnitude of the operator command. The control system is caused to determine a variable gain based on the amplitude of the operator command. The control system further is caused to determines an actuation command based on the variable gain. A total actuator position is a sum of the actuation command and the inceptor position. The control system is caused to send the actuation command to the one or more inline actuators. The one or more inline actuators actuate into the total actuator position to variably damp movement of the machine. The machine is variably damped as a function of the magnitude of the operator command.

In another aspect, a method for variably damping a machine by a control system having VRDC is disclosed. The method includes receiving, by a control module, an inceptor position from one or more active inceptors of the machine. The method includes calculating, by the control module, an operator command based on at least the inceptor position. The method also includes determining an amplitude of the operator command, wherein the amplitude is a magnitude of the operator command. The method further includes determining a variable gain based on the amplitude of the operator command. The method also includes determining an actuation command based on the variable gain. A total actuator position is a sum of the actuation command and the inceptor position. The method further includes sending the actuation command to the one or more inline actuators. The method also includes actuating the one more inline actuators into the total actuator position to variably damp movement of the machine. The machine is variably damped as a function of the magnitude of the operator command.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a control system having variable rate damping based control (VRDC). The control system is configured to variably damp movement of a machine, where the machine is variably damped as a function of a magnitude of an operator command. The operator command is received as input by the control system. In some instances, the movement of the machine is created by an inadvertent operator command. However, it is to be appreciated that the disclosed control system does not determine if an operator command is created inadvertently by an individual. The machine includes one or more inline actuators and one or more active inceptors. The control system instructs the one or more inline actuators of the machine to actuate into a total actuator position to variably damp the movement of the machine. The total actuator position of the one or more inline actuators is determined in part by a variable gain applied to a rate error signal as well as an inceptor position of the active inceptors.

The disclosure also describes a variable gain schedule for selecting the value of the variable gain. The variable gain schedule includes an inversely proportional relationship between the magnitude of the operator command received by the control system and the variable gain. Accordingly, small-amplitude operator commands result in a maximum gain value being selected. The value of the variable gain decreases as the amplitude of the operator command increases. Furthermore, a minimum gain value is selected in response to receiving relatively large-amplitude operator commands. Therefore, the machine rejects relatively small-amplitude operator commands, which are likely to be created inadvertently, and becomes more responsive as the amplitude of the operator commands increase.

Figure 1:
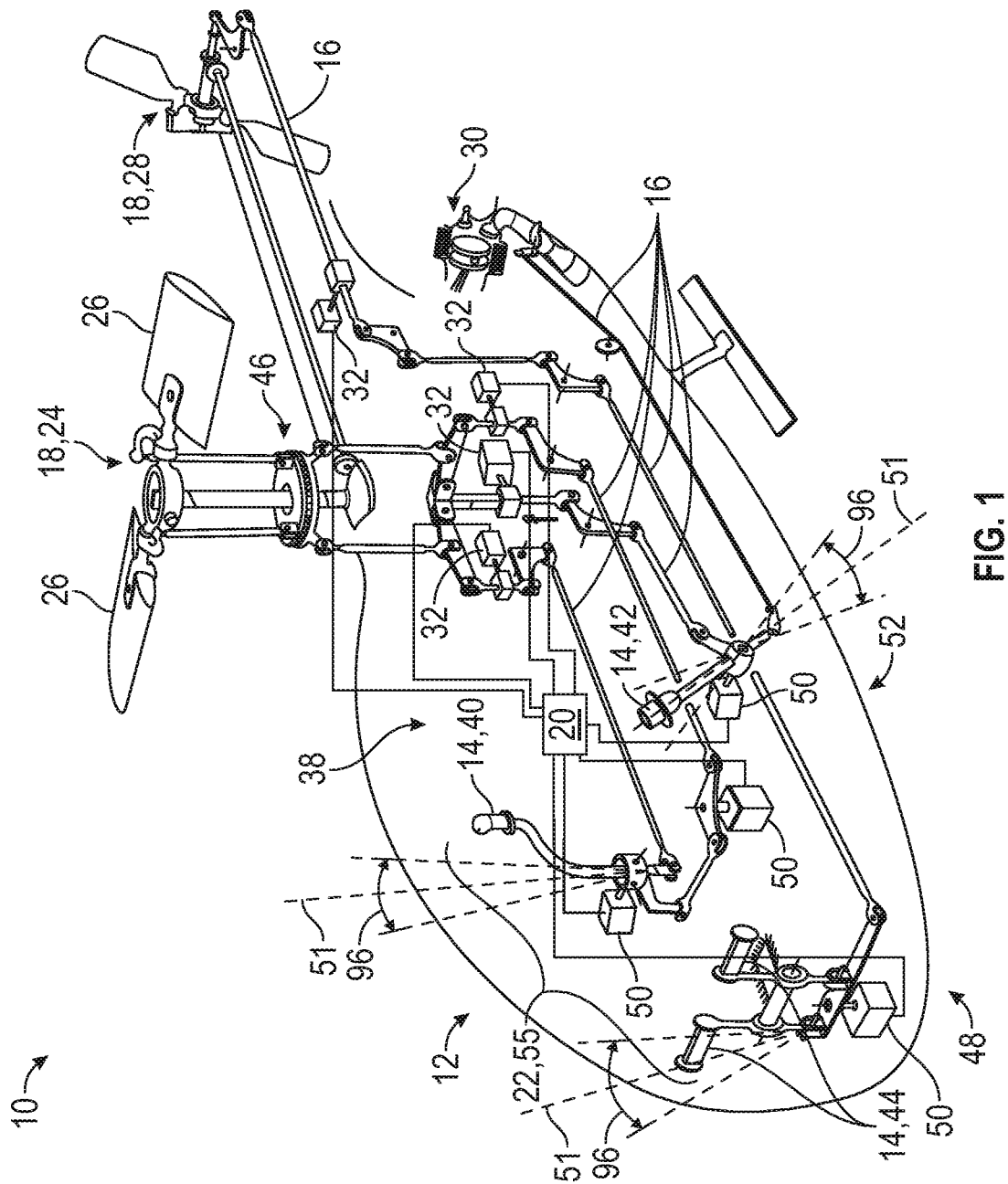
FIG. 1 is a diagram of a machine illustrated as a helicopter, where the machine is equipped with a variable rate damping based control (VRDC) system for active inceptors that are backdriven according to an aspect of the present disclosure.

Turning now to FIG. 1, a machine 10 is shown. The machine 10 is depicted as a helicopter 12. In one embodiment, the machine 10 is a vehicle. A vehicle may include, but is not limited to, a fixed or variable-wing aircraft, a rotorcraft, a spacecraft, a car, a sport utility vehicle (SUV), a van, a truck, a semi-truck, a train, a watercraft and/or other submersibles without departing from the scope or intent of the present disclosure. In several aspects, the machine 10 includes a plurality of control input devices. The control input devices are referred to as active inceptors 14.

Although a helicopter 12 is illustrated, it is to be appreciated that FIG. 1 is merely exemplary in nature and the machine 10 is not limited to a helicopter 12. Instead, the machine 10 may be any mechanical, hydraulic, pneumatic, and/or computerized system having a human operator in control of or otherwise utilizing inceptors that are back-driven. In one example, the machine 10 may be a manufacturing tool, construction equipment, a drilling machine, or a multi-axis machining tool.

The helicopter 12 of FIG. 1 is shown with a plurality of mechanical linkages 16 connecting the active inceptors 14 with a plurality of control effector devices 18. However, it is to be appreciated that in some machines 10, the mechanical linkages 16 may be partially or entirely replaced by electrical circuitry, hydraulic and/or pneumatic lines, or any combination thereof. A control module 20 receives control inputs from the active inceptors 14 of an operator interface 22 and relays movement commands from the active inceptors 14 to one or more inline actuators 32 that cause movement or actuation of the control effector devices 18.

The control effector devices 18 of the helicopter 12 of FIG. 1 include at least a main rotor 24 having a plurality of main rotor blades 26. In some examples, the control effector devices 18 further include a tail rotor 28. If the helicopter 12 includes tandem rotors, then a second main rotor (not shown) having a second plurality of main rotor blades (also not shown) is provided. Both the main rotor 24 and tail rotor 28 are powered by an engine 30. In several aspects, the engine 30 is an internal combustion engine (ICE) such as a diesel engine, a gasoline engine, an electric motor, a turbine engine, or any other type of prime mover. In another embodiment, if the machine 10 is a fixed-wing aircraft-type machine 10 (not shown), then the control effector devices 18 include an engine 30, motor, or other prime mover operably connected to a throttle, and a steering mechanism operably connected to one or more of ailerons, one or more elevators, one or more rudders, and one or more braking systems. In further examples of fixed wing aircraft, the machine 10 may be an unpowered machine 10 such as a glider or the like. The control effector devices 18 of such an unpowered fixed-wing aircraft-type machine 10 include a steering mechanism operably connected to a plurality of ailerons, one or more elevators, one or more rudders, and one or more braking systems. In the example of a motorized machine 10 such as an automobile, the control effector devices 18 include a plurality of brakes operable via a braking system, an engine 30, motor, or other prime mover operably connected to a throttle, and a steering wheel operably connected to steerable wheels. Likewise, in examples of watercraft-type vehicles, the control effector devices 18 may include an engine 30, motor, or other prime mover operably connected to a throttle, a rudder, a dive plane, a thruster, or the like operably connected to a steering mechanism and/or a roll, a pitch, and/or a yaw adjustment mechanism. In an embodiment, each of the control effector devices 18 is actively movable or actuatable by an inline actuator 32. The inline actuator 32 is capable of mechanically, electrically, pneumatically, or hydraulically moving the control effector devices 18 to manage, maintain, or alter a current machine state 33. In several aspects, the inline actuators 32 are electrical motors, linear actuators, or the like, however it should be appreciated that any mechanical, electrical, hydraulic, or pneumatic actuator may be used depending on the particular application.

In each of the foregoing machine 10 examples, the control effector devices 18 are controlled by a control module 20 operably connected to the operator interface 22 disposed within a cabin 38 of the machine 10. The operator interface 22 includes one or more active inceptors 14 operably connected to the control effector devices 18 of the machine 10. The active inceptors 14 of the helicopter 12 of FIG. 1 include a cyclic 40, a collective 42, and anti-torque pedals 44. The cyclic 40 is an active inceptor 14 movable in at least longitudinal and lateral directions and operates to vary a pitch of the main rotor blades 26 with fore and aft (longitudinal) movement. Varying the pitch of the main rotor blades 26 tilts the main rotor 24 disk forward and/or aft via a swashplate 46. By tilting the main rotor 24 in a longitudinal direction, movement of the nose 48 of the helicopter 12 is induced, causing the nose 48 to pitch up or down depending on the movement of the cyclic 40. Thus, a pilot of the helicopter 12 uses the cyclic 40 to adjust forward speed and control rolled turns of the helicopter 12 as well as to control fore/aft movement of the helicopter 12 in hovering flight. When manipulating the cyclic 40 in a side-to-side (lateral) direction, the cyclic 40 tilts the main rotor 24 disk left and right via the swashplate 46 in a lateral direction, thereby inducing the helicopter 12 to roll in the direction in which the cyclic 40 has been moved. Thus, a pilot of the helicopter 12 uses the cyclic 40 to adjust lateral or sideways movement of the helicopter 12 in both forward and rearward flight, as well as in hovering flight.

The collective 42 is an active inceptor 14 that changes an angle of attack of the main rotor blades 26 via the swashplate 46. Altering the angle of attack of the main rotor blades 26 increases or decreases a pitch angle of all of the main rotor blades 26 equally, thereby causing the helicopter 12 to ascend or descend accordingly. Furthermore, altering the angle of attack of the main rotor blades 26 increases or decreases torque, thereby translating into thrust and lift for the helicopter 12. In one embodiment, throttle controls managing the engine 30 of the helicopter 12 are interlinked with the collective 42. In forward and/or rearward flight, the collective 42 operates to adjust power through the main rotor 24 via a main rotor blade 26 pitch setting, while in hovering flight, the collective 42 adjusts helicopter 12 height and/or vertical speed.

The anti-torque pedals 44 of the helicopter 12 are active inceptors 14 that control collective pitch supplied to the tail rotor 28. Thus, the anti-torque pedals 44 have the primary effect of managing a yaw or rotational rate of the helicopter 12. In forward and/or rearward flight, the anti-torque pedals 44 adjust a sideslip angle of the helicopter 12, and in hovering flight, the anti-torque pedals 44 control a yaw rate and heading direction for the helicopter 12.

One or more of the active inceptors 14 of the operator interface 22 is actively backdriven. An active inceptor 14 is configured to provide tactile cues to the pilot or operator of the helicopter 12 and also provides backdrive functionality. To provide the active backdrive functionality and tactile cues for the pilot, active inceptors 14 are equipped with a backdrive actuator 50. A key tactile cue provided by the backdrive actuator 50 is a zero-force detent 51. The backdrive actuator 50 manipulates or moves the position of the zero-force detent 51 on the active inceptors 14 that reflects an inceptor position required to maintain a current machine state 33. The backdrive actuator 50 backdrives each active inceptor 14 through the zero-force detent 51. For example, the cyclic 40 of the helicopter 12 is positioned at the zero-force detent 51 to maintain a given flight course or heading. However, an operator may exert a breakout force upon the cyclic 40 to change the current flight course or heading of the helicopter 12. Specifically, the cyclic 40 is urged or moved out of the zero-force detent 51 when the breakout force is applied.

As an example, during an automated flight of a helicopter 12 of the present disclosure, the cyclic 40, collective 42, and anti-torque pedals 44 may be actively moved and adjusted by an onboard flight system to maintain a particular main rotor 24 and tail rotor 28 positioning, trims, and power levels. Accordingly, the helicopter 12 follows a flight course or heading without operator or pilot force input. In order to counteract torque imparted to a fuselage 52 of the helicopter 12 by the main rotor 24, the onboard flight system may command the anti-torque pedals 44 to move to a position commensurate with the desired flight course or heading, and to maintain the desired flight course or heading by constantly adjusting the position of the anti-torque pedals 44. Accordingly, the anti-torque pedals 44, as well as the collective 42, and the cyclic 40 may be actively backdriven via the zero-force detent 51 as the onboard flight system operates continuously to maintain a given flight course or heading. The zero-force detent 51 represents the required position of the active inceptors 14 to maintain the desired flight course or heading. The zero-force detent 51 alleviates series actuator saturation, gives the pilot or operator an indication of what the helicopter 12 is doing at a given point in time, and allows the pilot to make off-axes control inputs necessary to maintain a current machine state 33, such as a heading when control inputs are made in other axes. Moreover, the zero-force detent 51 offers the pilot an indication of where the vehicular trim is at a given point in time and showing how much control authority remains over the various active inceptors 14 which are equipped to the helicopter 12.

Figure 2A:
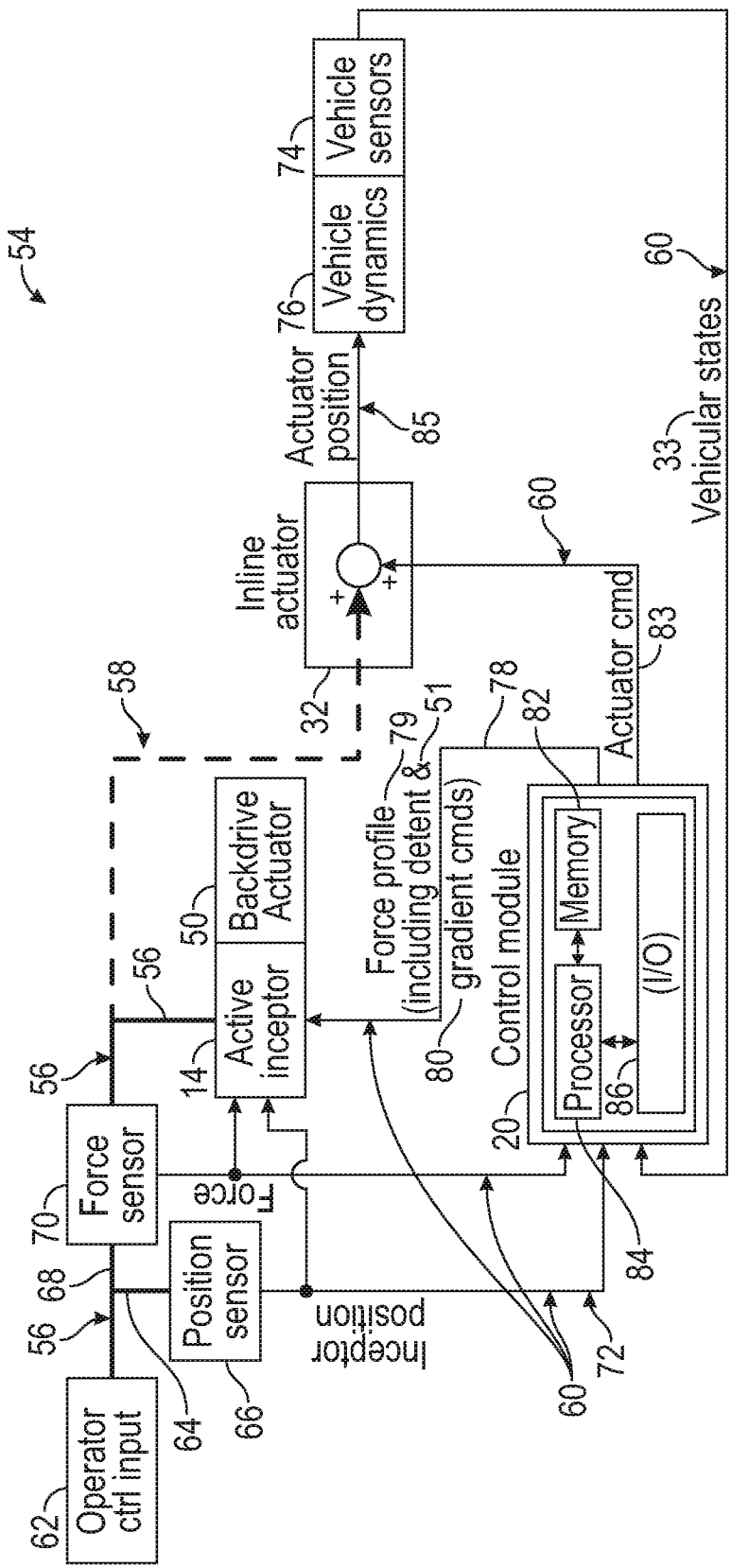
FIG. 2A is a system diagram of a control system having a VRDC system for active inceptors according to an aspect of the present disclosure.

Turning now to FIG. 2A, and with continuing reference to FIG. 1, the helicopter 12 is equipped with a control system 54 having variable rate damping based control (VRDC). The control system 54 includes a generic active inceptor 14 that is backdriven and one or more inline actuators 32. Mechanical signals 56 connect the various components of the control system 54. Optional mechanical signals 58 may, in some examples, connect some or all of the components of the control system 54. Electrical signals 60 also connect various components of the control system 54. However, it is to be appreciated that that the control system 54 of FIGS. 1 and 2A may vary in componentry and in terms of the mechanical signals 56, and/or optional mechanical signals 58, and/or electrical signals 60 utilized between the various components of the control system 54 without departing from the scope or intent of the present disclosure. Additionally, the VRDC may be used in fully digitally controlled (e.g. fly-by-wire or fly-by-light) control systems 54 with active inceptors 14 as well as partial authority mechanical control systems 54 (e.g. an active parallel actuation system (APAS)) with active inceptors 14. In some aspects, the optional mechanical signals 58 are required for mechanical control systems 54, but not necessarily for fully digital or electrical control systems 54.

In FIG. 2A, the control system 54 receives an operator control input 62 to one or more of the active inceptors 14. Specifically, the operator control input 62 is received as a position input 64 to a position sensor 66 and a force input 68 to a force sensor 70. The position input 64 indicates an absolute position of the active inceptor 14 compared to a reference position, such as the zero-force detent 51. The force input 68 indicates a quantity of force that the operator uses to adjust the position of the active inceptor 14. Primarily, the force input 68 is proportional to the displacement the operator moves the active inceptor 14 from the zero-force detent 51 position. The force input 68 and the position input 64 are communicated as an inceptor position 72 to the control module 20.

The control module 20 executes instructions to receive the inceptor position 72 from the active inceptor 14. Specifically, the control module 20 executes instructions to receive the inceptor position 72 from the position sensor 66 and the operator input force from the force sensor 70. Additional instructions to receive current machine states 33 such as vehicle dynamics, gyroscopic position, velocity, altitude, bank angle, and the like from a plurality of vehicle sensors 74 are also received by the control module 20. In several aspects, the plurality of vehicle sensors 74 are used by the control module 20 to manage operations of the machine 10, helicopter 12, or the like. In an example, the vehicle sensors 74 are used by the control module 20 to determine and manage vehicle dynamics 76, such as flight trajectory, path, or other such movement.

The control module 20 sends a first command 78 to the active inceptor 14. The first command 78 includes a force feel profile 79 component of the first command 78 including the zero-force detent 51 and a detent force gradient 80. FIG. 2A, which is described below, illustrates a graph 102 representing a modified force feel profile 79. Referring back to FIG. 2A, the control module 20 also sends a second actuator command 83, sometimes termed a series actuation command, to one or more inline actuators 32, thereby adjusting a position of the control effector device 18 movable via the relevant inline actuator 32 in response to the operator control input 62. In an example of a mixed electronic and mechanical control system 54, the inline actuator 32 actually combines a mechanical command and an electro-mechanical command. The inputs to the inline actuator 32 include both the optional mechanical signal 58 from the operator control input 62 through the force sensor 70, and the electrical signal 60 to the inline actuator 32. The electrical signal 60 is generated by the control module 20. Accordingly, the resulting actuator position 85 representing the inline actuator 32 position includes optional mechanical signal 58, and components of the electrical signal 60. In contrast, in an example of a full fly-by-wire control system 54, the optional mechanical signals 58 are not present and the only input into the inline actuator 32 is an electrical signal 60 from the control module 20. Therefore, in such a fly-by-wire control system 54, series actuation and/or series actuator saturation does not occur. It should be appreciated that variations from the above described fly-by-wire control system 54 and mixed mechanical and electronic control system 54 are intended to be within the scope of the present disclosure.

Figure 3:
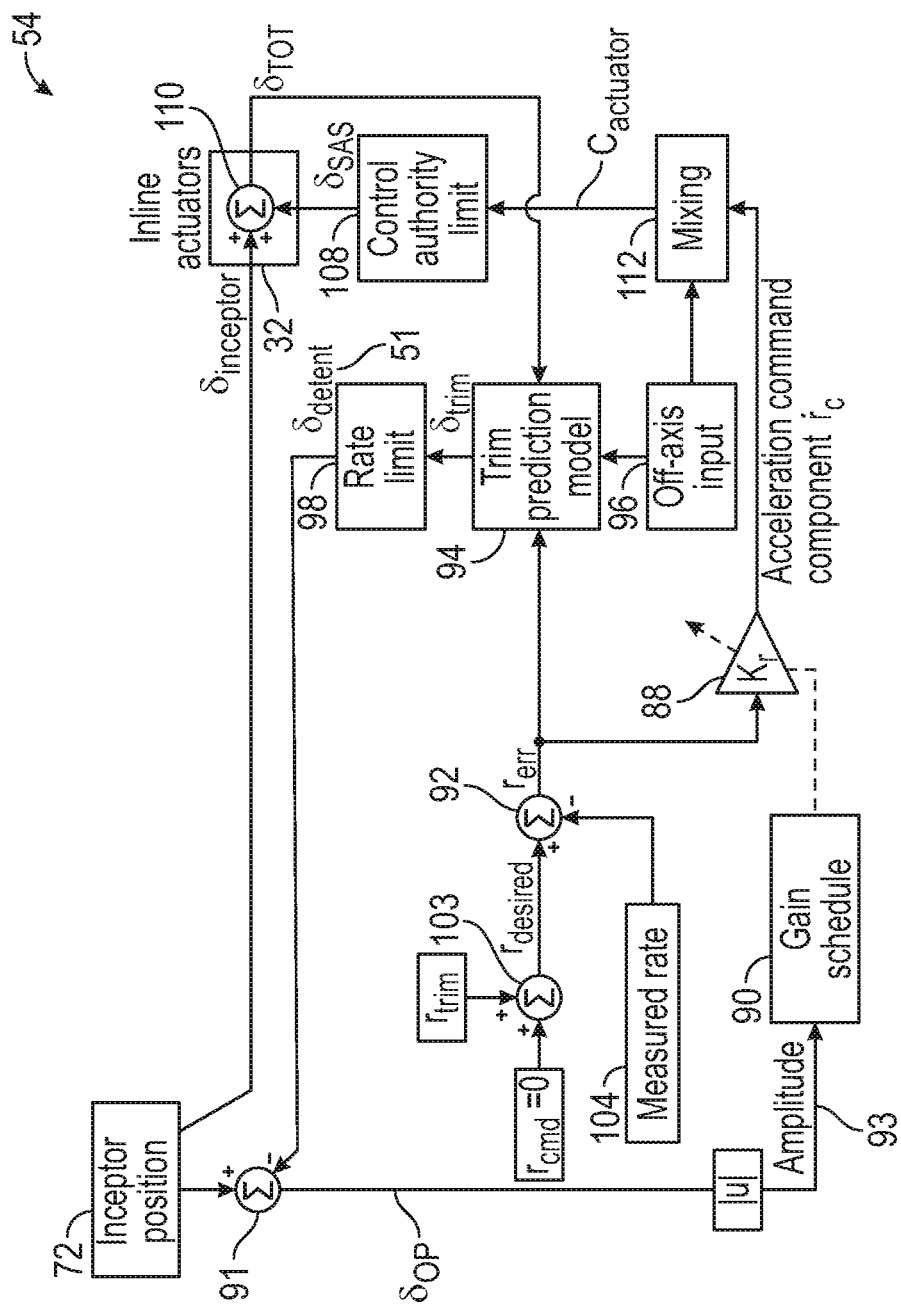
FIG. 3 is a diagram of a control system for determining a total position of one or more inline actuators of the machine based on a variable gain according to an aspect of the present disclosure.

In one embodiment, the operator control input 62 is either an automatic input from the control module 20 (i.e., a zero-force detent command detent as seen in FIG. 3), an operator control input 62 from a human operator, a plurality of either, or any combination thereof. In one example, the operator control input 62 is a programmatic input generated by flight or drive control logic stored within a memory 82 of the control module 20 and executed by a processor 84 of the control module 20. The control input is then communicated, via the input/output (I/O) interface 86 of the control module 20, from the processor 84 to the specific backdrive actuator 50, the second actuator command 83, or both, to adjust the actuator position 85 to affect an attitude, position, or the like of the machine 10. In an example of a machine 10, the inline actuator 32 manipulates or moves one or more of the control effector devices 18 and thereby acts to control one or more direction of movement of the machine 10.

Figure 2B:
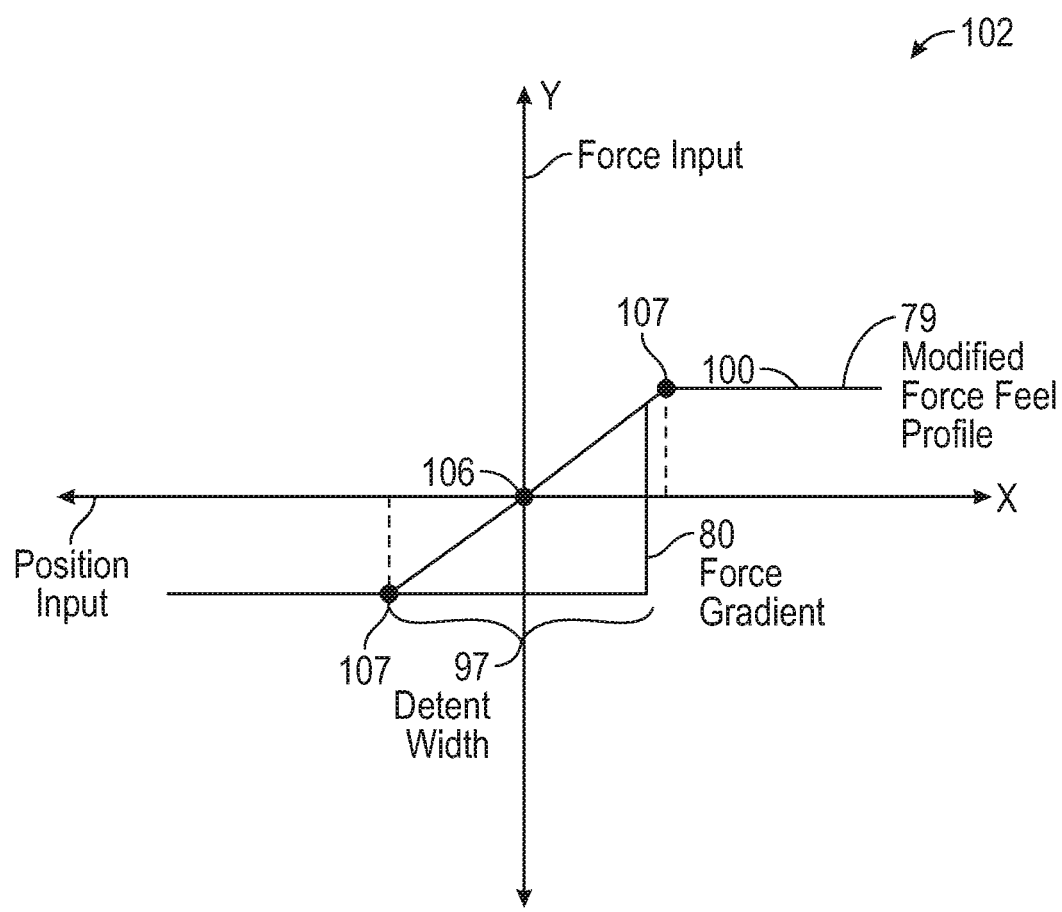
FIG. 2B is a graph illustrating a modified force feel profile according to an aspect of the present disclosure.

Referring to FIG. 2B, the graph 102 representing a modified force feel profile 79 is now described. The x-axis of the graph 102 represents a position input from the position sensor 66 (FIG. 2A) and the y-axis of the graph 102 represents a force input from the force sensor 70 (FIG. 2A). The graph 102 includes a line 100 representing a relationship between the position input and the force input, where the detent force gradient 80 represents the slope of the line 100. The line 100 also includes a detent width 97, which represents an amount of movement that the active inceptors 14 (FIGS. 1 and 2A) undergo before overcoming a breakout force to move out of the zero-force detent 51. The detent width 97 extends between two points 105, where each point 105 represents either a positive or a negative value of the breakout force of the active inceptors 14. The line 100 intersects the x-axis of the graph 102 at an intersection point 106. For example, in FIG. 2B the x value of the intersection point 106 is about zero, however it is to be appreciated that the graph 102 is merely exemplary in nature. The x value of the intersection point 106 represents the value of the zero-force detent 51. Thus, when an operator is not exerting force upon the active inceptors 14, the active inceptors 14 are located at the x value of the intersection point 106. Furthermore, the active inceptors 14 receive commands to move according to the profile of the line 100 representing the modified force feel profile 79.

Referring now to FIG. 3, a schematic diagram of the control system 54 is illustrated. The control system 54 determines a variable gain 88 based on a magnitude of an operator command $\delta_{OP}$. The variable gain 88 may be denoted as $K_r$. As explained below, the value of the variable gain 88 is determined based on a variable gain schedule 90, which is shown in detail in FIG. 4. Turning back to FIG. 3, the control system 54 receives the inceptor position 72 from one or more active inceptors 14 (seen in FIG. 2A). It is to be appreciated that the inceptor position 72 is a signal representation of an actual inceptor position $\delta_{INCEPTOR}$. Furthermore, it is also to be appreciated that the operator control input 62 (seen in FIG. 2A) is the actual inceptor position $\delta_{INCEPTOR}$. The inceptor position 72 is received as input by the one or more inline actuators 32 and a junction 91. The operator command $\delta_{OP}$ is calculated by the control module 20 (FIG. 2A) based on the inceptor position 72. Specifically, the junction 91 receives as input a zero-force detent command $\delta_{detent}$ from a rate limit 98 and the inceptor position 72. The junction 91 determines the operator command $\delta_{OP}$ based on a difference between the zero-force detent command detent and the inceptor position 72.

The control module 20 (FIG. 2A) then determines an amplitude 93 of the operator command $\delta_{OP}$. Specifically, the amplitude 93 of the operator command $\delta_{OP}$ is the magnitude $|u|$ of the operator command $\delta_{OP}$. The magnitude of the operator command $\delta_{OP}$ is an absolute value. The control module 20 determines the variable gain 88 based on the amplitude 93 of the operator command $\delta_{OP}$. The variable gain 88 is determined based on the amplitude 93 of the of the operator command $\delta_{OP}$ that is applied to a rate error $r_{err}$ of the machine 10. The rate error $r_{err}$ is described in greater detail below. The control module 20 applies the amplitude 93 of the operator command $\delta_{OP}$ to a variable gain schedule 90. As explained in greater detail below, a total actuator position $\delta_{TOT}$ of the one or more inline actuators 32 is determined in part based on the variable gain 88 applied to the rate error $r_{err}$.

Figure 4:
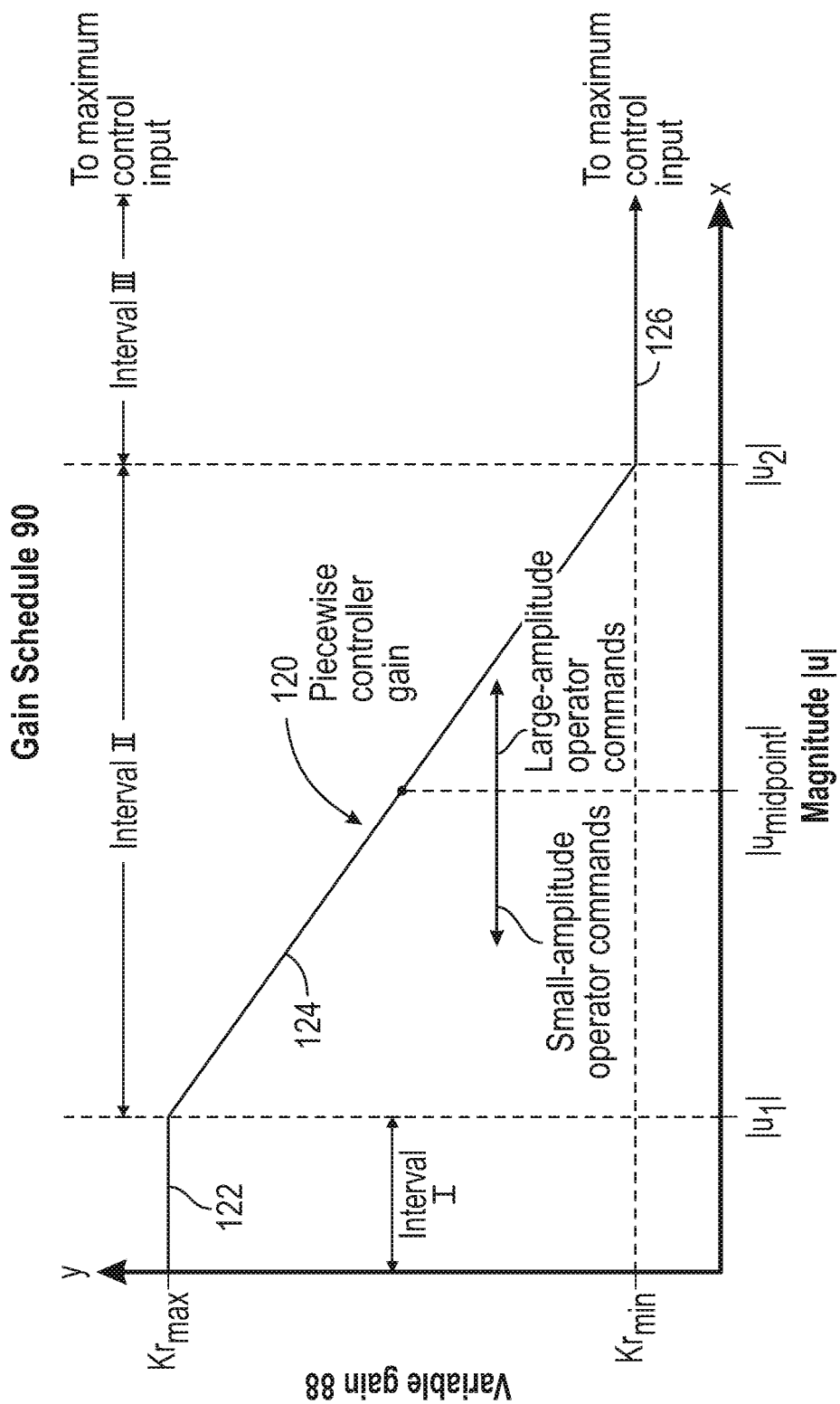
FIG. 4 is a diagram of a gain schedule for determining the variable gain of the control system shown in FIG. 3 according to an aspect of the present disclosure.

FIG. 4 illustrates a graph representing an exemplary variable gain schedule 90, where x-axis represents the magnitude $|u|$ of the operator command $\delta_{OP}$ and the y-axis represents the variable gain 88. The variable gain schedule 90 includes a piecewise controller gain 120. The piecewise controller gain 120 is divided into three subfunctions, namely a first subfunction 122, a second subfunction 124, and a third subfunction 126. The variable gain schedule 90 is also divided into three intervals labeled as Interval I, Interval II, and Interval III. As seen in FIG. 4, Interval I corresponds to the first subfunction 122, Interval II corresponds to the second subfunction 124, and Interval III corresponds to the third subfunction 126.

The first subfunction 122 of the piecewise controller gain 120 is applied to operator commands $\delta_{OP}$ ranging in value from zero to a first magnitude value $|u_1|$. The second subfunction 124 of the piecewise controller gain 120 is applied to operator commands $\delta_{OP}$ ranging in value from the first magnitude value $|u_1|$ to a second magnitude value $|u_2|$. The third subfunction 126 is applied to operator commands $\delta_{OP}$ ranging in value from the second magnitude value $|u_2|$ to a maximum control limit of the magnitude $|u|$ of the operator command $\delta_{OP}$. The maximum control limit may be an infinite value. The variable gain 88 ranges in value between a maximum value $K_{r_{max}}$ and a minimum value $K_{r_{min}}$. The first magnitude value $|u_1|$ is greater than zero and is less than the second magnitude value $|u_2|$ (i.e., $0<|u_1|<|u_2|$).

It is to be appreciated that the specific values of the maximum value $K_{r_{max}}$ and the minimum value $K_{r_{min}}$ of the variable gain 88 are selected based on the application. In one example of the control system 54, a majority or substantially all of the movement of the machine 10 may need to be damped in response to receiving inadvertent operator commands $\delta_{OP}$. Thus, the maximum value $K_{r_{max}}$ of the variable gain 88 is set to a value that results in a majority or substantially all of the movement of the machine 10 (FIG. 1) being damped. Likewise, in another aspect, the minimum value $K_{r_{min}}$ of the variable gain 88 is set to a value that results in the movement of the machine 10 (FIG. 1) being substantially less damped. In other words, the minimum value $K_{r_{min}}$ of the variable gain 88 results in a machine 10 that is more responsive to intentional operator commands $\delta_{OP}$. In one non-limiting example of the variable gain 88, movement of the actively backdriven anti-torque pedals 44 of the helicopter 12 (FIG. 1) corresponds to a yaw rate. Thus, the variable gain 88 is applied to the yaw rate error of the helicopter 12.

The first subfunction 122 is equal to the maximum value $K_{r_{max}}$ of the variable gain 88. Accordingly, operator commands $\delta_{OP}$ ranging from zero to the first magnitude value $|u_1|$ result in the variable gain 88 being equal to the maximum value $K_{r_{max}}$. The second subfunction 124 of the piecewise controller gain 120 defines an inversely proportional relationship between the amplitude 93 (FIG. 2A) of the operator command Bop and the variable gain 88. Accordingly, operator commands $\delta_{OP}$ ranging from the first magnitude value $|u_1|$ to the second magnitude value $|u_2|$ result in the variable gain 88 being equal to a value ranging between the maximum value $K_{r_{max}}$ and the minimum value $K_{r_{min}}$. Although FIG. 4 illustrates the second subfunction 124 as a linear function, it is to be appreciated that FIG. 4 is merely exemplary in nature and the second subfunction 124 may include a non-linear profile as well. The third subfunction 126 is equal to the minimum value $K_{r_{min}}$ of the variable gain 88. Accordingly, operator commands $\delta_{OP}$ ranging from the second magnitude value $|u_2|$ to the maximum control input result in the variable gain 88 being equal to the minimum value $K_{r_{min}}$.

The gain schedule 90 also defines a midpoint $|u_{midpoint}|$, which is located at a midpoint between the first magnitude value $|u_1|$ and the second magnitude value $|u_2|$. Magnitude values ranging from zero to about the midpoint $|u_{midpoint}|$ represent small-amplitude operator command $\delta_{OP}$, while magnitude values ranging from the about the midpoint $|u_{midpoint}|$ to the maximum control input represent large-amplitude operator commands $\delta_{OP}$. Thus, the first magnitude value $|u_1|$ is a small-amplitude operator command $\delta_{OP}$ and the second magnitude value $|u_2|$ is a large-amplitude operator command $\delta_{OP}$. It is to be appreciated that small-amplitude operator commands $\delta_{OP}$ tend to be created by inadvertent operator input, while large-amplitude operator commands $\delta_{OP}$ are more likely to be generated intentionally. However, it is to be appreciated that not all small-amplitude operator commands $\delta_{OP}$ are inadvertent. Furthermore, it is to be understood the control system 54 is not configured to determine if the operator command $\delta_{OP}$ is inadvertent. Instead, the control system 54 simply applies a relatively high variable gain 88 in response to receiving small-amplitude operator commands $\delta_{OP}$.

As the magnitude $|u|$ of the operator command $\delta_{OP}$ increases, the likelihood that the operator command $\delta_{OP}$ is inadvertent or unintentional decreases. Accordingly, as the magnitude $|u|$ of the operator command $\delta_{OP}$ increases within Interval II, the value of the variable gain 88 decreases. The inversely proportional relationship between the amplitude 93 of the operator command $\delta_{OP}$ and the variable gain 88 of the second subfunction 124 is based on the control system's 54 sensitivity to changes in magnitude of the operator command $\delta_{OP}$. That is, if the control system 54 is highly sensitive to changes in the magnitude $|u|$ of the operator command $\delta_{OP}$, then the slope of the second subfunction 124 increases. Specifically, it is to be appreciated that the equation of a line is expressed as y=mx+b, where the variable m represents slope. Therefore, as the slope m increases (i.e., becomes steeper), then the sensitivity of the control system 54 to changes in magnitude of the operator command $\delta_{OP}$, increases. Similarly, when the slope m decreases, then the sensitivity of the control system 54 to changes in magnitude $|u|$ of the operator command $\delta_{OP}$ decreases as well. The inversely proportional relationship of the second subfunction 124 includes a negative slope (i.e., y=−mx+b).

Referring back to FIG. 3, the rate error $r_{err}$ of the machine 10 is now described. The control module 20 (seen in FIG. 2A) receives a commanded rate $r_{cmd}$ of the machine 10 and a trim rate $r_{trim}$. In the present disclosure, the commanded rate $r_{cmd}$ is set to zero (i.e., $r_{cmd}$=0). A junction 103 receives as input the commanded rate $r_{cmd}$ of the machine 10 and the trim rate $r_{trim}$. The junction 103 adds or combines the commanded rate $r_{cmd}$ and the trim rate $r_{trim}$ together to determine a desired rate $r_{desired}$. In an example, the desired rate $r_{desired}$ is a non-zero value representing a requested pattern of movement of the machine 10 (FIG. 1). However, it is to be appreciated that the desired rate $r_{desired}$ may be a zero value as well. The desired rate $r_{desired}$ is received by a junction 92. The junction 92 also receives a measured rate 104 of the machine 10. The junction 92 compares the measured rate 104 with the desired rate $r_{desired}$ and determine the rate error $r_{err}$ based on a difference between the measured rate 104 and the desired rate $r_{desired}$.

The control module 20 monitors the machine 10 to determine the measured rate 104. Accordingly, the measured rate 104 represents an actual state of the machine 10. For example, if the machine 10 is the helicopter 12 (seen in FIG. 1), then the measured rate 104 may represent measurements such as, but not limited to, a current flight direction, yaw, pitch, and roll characteristics the helicopter 12. The rate error $r_{err}$ is received as input by a trim prediction model 94. The trim prediction model 94 is a steady state component of the operator control input 62 (FIG. 2A) based in part on one or more off-axis inputs 96. For example, if the machine 10 is the helicopter 12 (FIG. 1), then the trim prediction model 94 is a steady state component of a flight state (e.g., rate, attitude, or altitude) of the helicopter 12. In addition to the rate error $r_{err}$, the trim prediction model 94 received as input the off-axis inputs 96 and the total actuator position $\delta_{TOT}$ of the one or more inline actuators 32. The trim prediction model 94 combines the off-axis inputs 96, the rate error $r_{err}$, and the total actuator position $\delta_{TOT}$ together. The trim prediction model 94 then determines a change in position $\delta_{TRIM}$ of the zero-force detent 51 (seen in FIGS. 1 and 2A) based on the combination of the one or more off-axis inputs 96, the rate error $r_{err}$, and the total actuator position $\delta_{TOT}$.

Continuing to refer to FIG. 3, a rate limit 98 is applied to the change in position $\delta_{TRIM}$ of the zero-force detent 51 to determine a zero-force detent command $\delta_{detent}$. The rate limit 98 represents a parameter limit value configured to limit a rate of the zero-force detent command $\delta_{detent}$. The zero-force detent command $\delta_{detent}$ and the inceptor position 72 are both received as input by the junction 91. The operator command $\delta_{OP}$ is determined based on a difference between the zero-force detent command $\delta_{detent}$ and the inceptor position 72.

An acceleration command component $\dot{r}_c$ is derived based on the variable gain 88 and the rate error $r_{err}$. In one aspect, the acceleration command component $\dot{r}_c$ is the product of the variable gain 88 and the rate error $r_{err}$ (i.e., variable gain 88×the rate error $r_{err}$). It is to be appreciated the acceleration command component $\dot{r}_c$ may be applied to a variety of acceleration commands such as, but not limited to, yaw, pitch, roll, or vertical rate commands. The acceleration command component $\dot{r}_c$ and one or more off-axis inputs 96 are received as input by a mixing block 112 and are mixed together. An unlimited actuator command $C_{actuator}$ is generated based on mixing the one or more off-axis inputs 96 and the acceleration command component $\dot{r}_c$ together.

A control authority limit 108 is then applied to the unlimited actuator command $C_{actuator}$. A stability augmentation system command $\delta_{SAS}$ is determined based on applying the control authority limit 108 to the unlimited actuator command $C_{actuator}$. The stability augmentation system command $\delta_{SAS}$ is applied in combination with the inceptor position 72 to the one or more inline actuators 32. The total actuator position $\delta_{TOT}$ is a sum of the stability augmentation system command $\delta_{SAS}$ and the inceptor position (72). In response to receiving the stability augmentation system command $\delta_{SAS}$ in combination with the inceptor position 72, the one or more inline actuators 32 move into the total actuator position $\delta_{TOT}$. When the one or more inline actuators 32 move into the total actuator position $\delta_{TOT}$, movement of the machine 10 (FIG. 1) is variably damped.

Referring to both FIGS. 2A and 3, the stability augmentation system command $\delta_{SAS}$ is representative of the second actuator command 83. As mentioned above, the second actuator command 83 may also be referred to as a series actuation command. Thus, the control authority limit 108 applies to a series actuator control authority of the one or more inline actuators 32. Moreover, the control authority limit 108 applies only to partial authority control systems 54. Partial authority control systems are non-fly-by-wire control systems that include the optional mechanical signals 58 (seen in FIG. 2A). The series actuator control authority is a portion of a total authority limit of the one or more inline actuators 32. The total authority limit refers to the entire range of movement of the one or more inline actuators 32. As an example, in some types of applications the series actuator control authority ranges from about ten percent to about twenty percent of the total control authority (i.e., ≈10%-20%).

It is to be appreciated that fly-by-wire systems send an electronic signal indicating the inceptor position 72 electronically to the one or more inline actuators 32. In other words, the control module 20 electronic signal sent to the one or more inline actuators 32 indicates the inceptor position 72 as well as the stability augmentation system command $\delta_{SAS}$ component. However, in a partial authority control system 54, the inceptor position 72 is sent as a mechanical signal to the one or more inline actuators 32. That is, when a partial authority system is employed the control module 20 electronic signal sent to the one or more inline actuators 32 only includes the stability augmentation system command $\delta_{SAS}$, and not the inceptor position 72 component.

Referring to FIG. 1, depending on which particular active inceptor 14 is being manipulated by the operator, various different aspects of movement of the helicopter 12 are affected. For example, depending on which of the cyclic 40, collective 42, and/or anti-torque pedals 44 is being used by the pilot of a helicopter 12, the variable gain 88 may be applied to some or all of the helicopter's 12 yaw rate, roll rate, pitch rate, or vertical rate errors. That is, applying the variable gain 88 as a function of the movement of some or all of the cyclic 40, collective 42, and anti-torque pedals 44 relative to their corresponding zero-force detent 51 results in damping the rate of movement of the helicopter 12. The variable gain 88 is applied to the rate error $r_{err}$ of the helicopter 12 in some or all the axes that correspond to that of the operator control input 62.

The backdrive rate of an active inceptor 14 indirectly affects the value of the variable gain 88. Specifically, when the backdrive rate of a given active inceptor 14 is relatively high, this indicates there is a relatively high chance that relative movement between the active inceptor 14 and the zero-force detent 51 was created unintentionally by the operator. Such relative movement between the active inceptor 14 and the zero-force detent may be referred to as an inadvertent operator input and is usually a small-amplitude input. As seen in FIG. 4, the value of the variable gain 88 for a relatively small-amplitude input is set to the maximum value. In contrast, there is a relatively high chance that large-amplitude inputs represent intentional contact between the operator and the active inceptor 14. Thus, as seen in FIG. 4, the variable gain 88 is set to a relatively small value. The inadvertent movement between the one or more active inceptors 14 and the corresponding zero-force detent 51 is mitigated by applying the stability augmentation system command $\delta_{SAS}$. Mitigating the inadvertent relative movement may reduce operator confusion as well as improve the controllability and/or stability of the control system 54.

Figure 5:
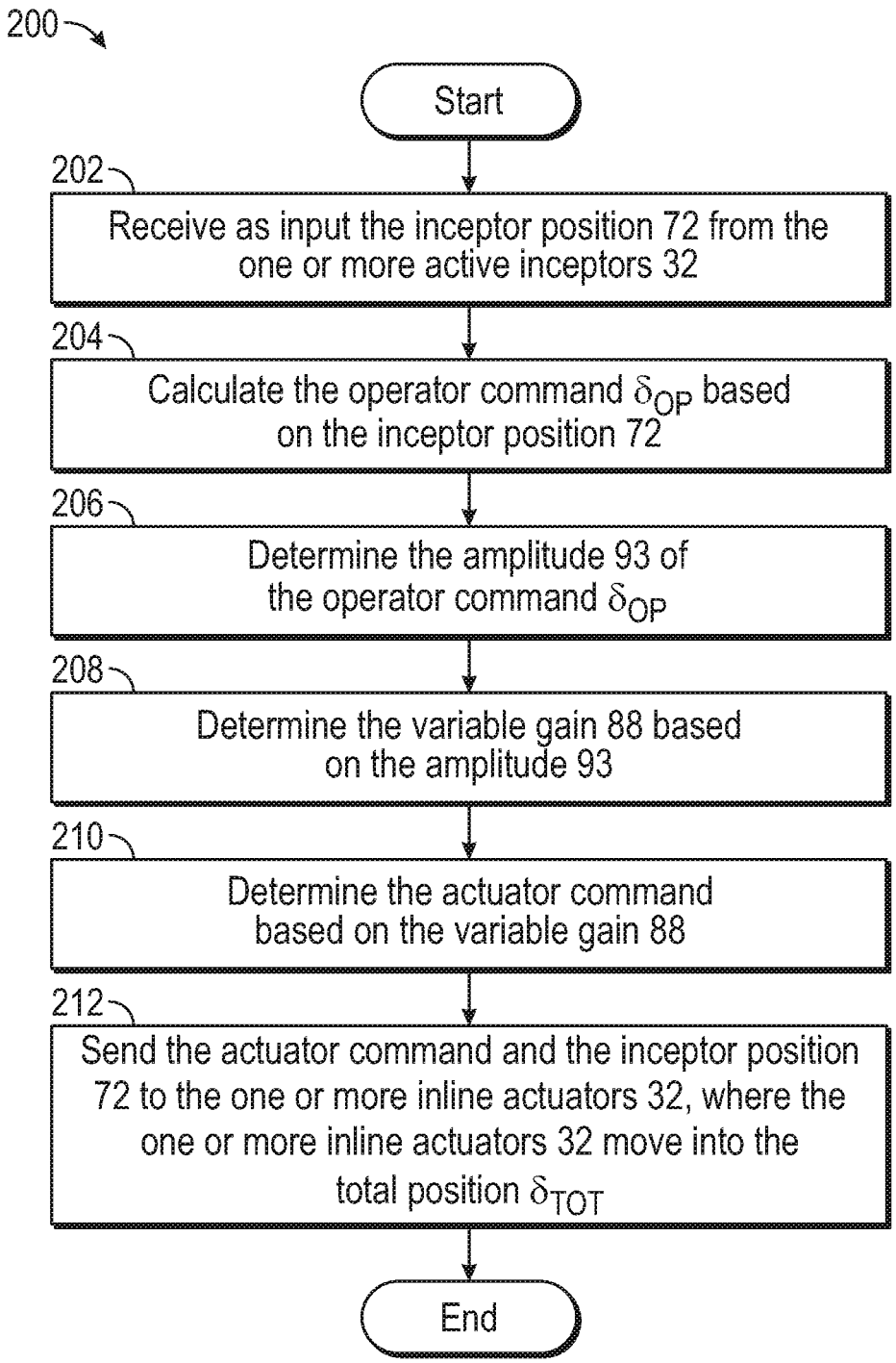
FIG. 5 is an exemplary process flow diagram illustrating a method for variably damping the machine as a function of the magnitude of the operator command.

FIG. 5 illustrates an exemplary process flow diagram illustrating a method 200 for variably damping the machine 10 as a function of the magnitude of the operator command $\delta_{OP}$. Referring generally to FIGS. 1-4, the method 200 begins at block 202. In block 202, the control system 54 receives as input the inceptor position 72 from the one or more active inceptors 14. The method 200 may then proceed to block 204.

In block 204, the control module 20 calculates the operator command $\delta_{OP}$ based on the inceptor position 72 received from the one or more active inceptors 14. Specifically, the operator command $\delta_{OP}$ is determined based on the difference between the zero-force detent command $\delta_{detent}$ and the inceptor position 72. The method 200 may then proceed to block 206.

In block 206, the control module 20 determines the amplitude 93 of the operator command $\delta_{OP}$, where the amplitude is the magnitude $|u|$ of the operator command $\delta_{OP}$. The method 200 may then proceed to block 208.

In block 208, the control module 20 determines the variable gain 88. Specifically, as seen by the variable gain schedule 90 in FIG. 4, the variable gain 88 is determined based on the amplitude 93 of the operator command $\delta_{OP}$. The method 200 may then proceed to block 210.

In block 210, the control module 20 determines an actuation command that is sent to the one or more inline actuators 32, where the actuation command is based on the variable gain 88. As seen in FIG. 3, the actuation command sent to the one or more inline actuators 32 is the stability augmentation system command $\delta_{SAS}$. The inceptor position 72 is also sent to the one or more inline actuators 32. As mentioned above, the inceptor position 72 is only sent by the control module 20 for fly-by-wire systems. When a partial authority control system 54 is employed, the inceptor position 72 is sent mechanically. The method 200 may then proceed to block 212.

In block 212, in response to receiving the actuation command and the inceptor position 72, the one or more inline actuators 32 move into the total actuator position $\delta_{TOT}$ to variably damp movement of the machine 10. As mentioned above, the machine 10 is variably damped as a function of the magnitude $|u|$ of the operator command $\delta_{OP}$. The method 200 may then terminate.

Referring generally to the figures, the disclosed control system 54 provides various technical effects and benefits. Specifically, the control system 54 employs a stability augmentation system (SAS) based approach for providing dynamic stability and control augmentation while improving control response. Conventional SAS based control systems do not account for the amplitude of the operator input when determining the damping rate, and therefore tend to have sluggish control responses. In contrast, the present disclosure describes an approach for improving the control response of an SAS based control system by varying the gain based on the magnitude of the operator input. Specifically, the control system 54 applies a maximum variable gain value in response to small-amplitude operator inputs, which in turn result in a more damped machine. Thus, the machine tends to reject relatively small-amplitude operator control inputs. As mentioned above, small-amplitude operator control inputs are likely to be created by inadvertent operator control input.

It is to be appreciated that the likelihood that an operator control input is inadvertent decreases as the amplitude of the operator command increases. That is, in other words, large-amplitude operator control inputs tend to be intentional. Accordingly, the value of the variable gain decreases as the amplitude of the operator control input increases based on an inversely proportional relationship between operator command input and the variable gain. Thus, the control system 54 applies a minimum value for the variable gain in response to large-amplitude operator commands, which are more likely to be intentional. Thus, the minimum gain results a less damped machine response. In other words, the minimum gain results in a machine that is more responsive intentional operator inputs.

Figure 6:
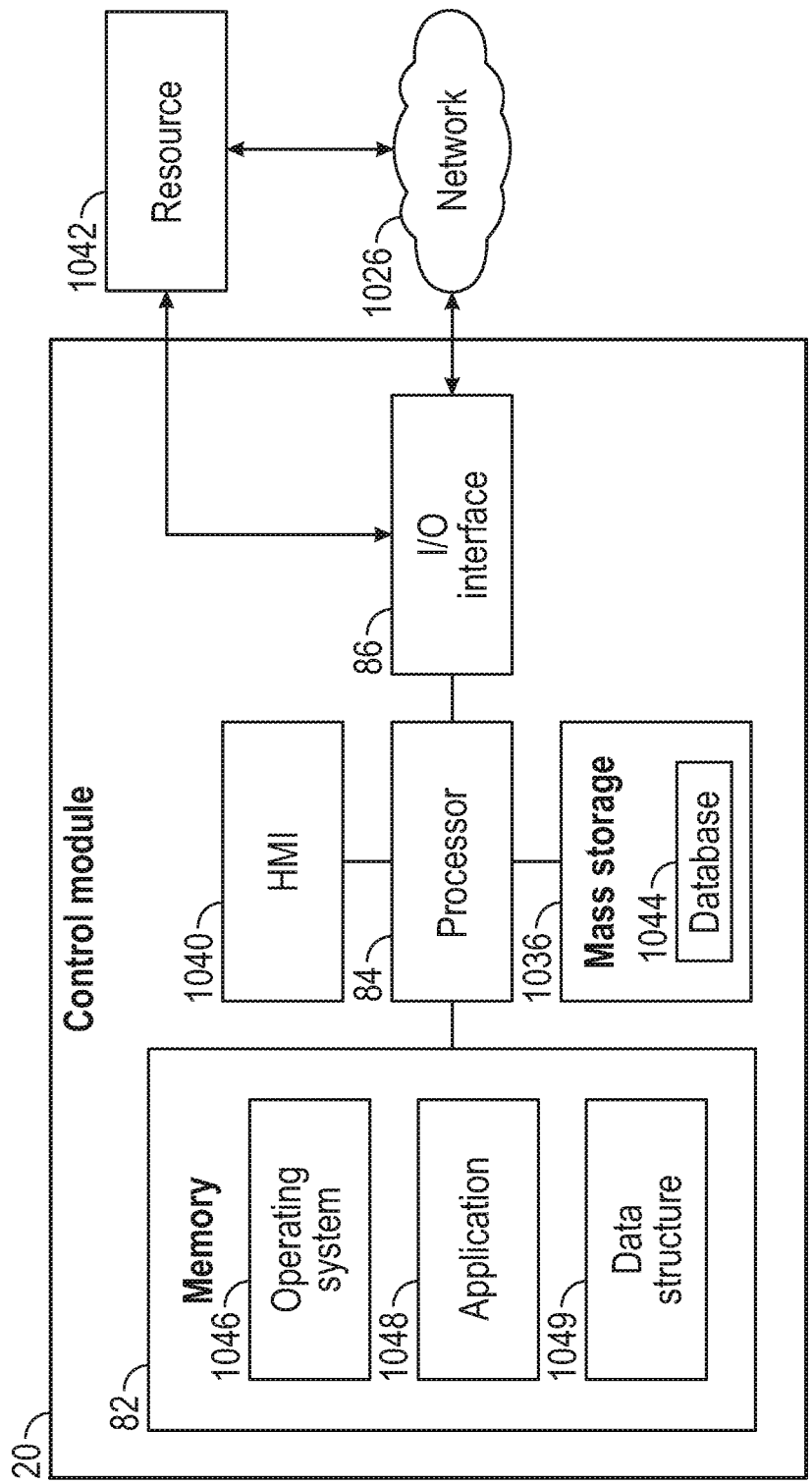
FIG. 6 is an illustration of a computer system used by the control system of FIG. 1 according to an exemplary embodiment.

Turning now to FIG. 6, the control system 54 is implemented on one or more computer devices or systems, such as exemplary control module 20. The control module 20 includes a processor 84, a memory 82, a mass storage memory device 1036, an input/output (I/O) interface 86, and a Human Machine Interface (HMI) 1040. The control module 20 is operatively coupled to one or more external resources 1042 via a network 1026 or I/O interface 86. External resources may include, but are not limited to, servers, databases, mass storage devices, peripheral devices, cloud-based network services, or any other suitable computer resource that may be used by the control module 20.

The processor 84 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 82. Memory 82 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 136 includes data storage devices such as a hard drive, optical drive, tape drive, volatile or non-volatile solid-state device, or any other device capable of storing information.

The processor 84 operates under the control of an operating system 1046 that resides in memory 82. The operating system 1046 manages computer resources so that computer program code embodied as one or more computer software applications, such as an application 1048 residing in memory 82, may have instructions executed by the processor 84. In an alternative example, the processor 84 may execute the application 1048 directly, in which case the operating system 1046 may be omitted. One or more data structures 1049 also reside in memory 82, and may be used by the processor 84, operating system 1046, or application 1048 to store or manipulate data.

The I/O interface 86 provides a machine interface that operatively couples the processor 84 to other devices and systems, such as the network 1026 or external resource 1042. The application 1048 thereby works cooperatively with the network 1026 or external resource 1042 by communicating via the I/O interface 86 to provide the various features, functions, applications, processes, or modules comprising exemplary embodiments. The application 1048 also includes program code that is executed by one or more external resources 1042, or otherwise rely on functions or signals provided by other system or network components external to the control module 20. Indeed, given the nearly endless hardware and software configurations possible, persons having ordinary skill in the art will understand that embodiments may include applications that are located externally to the control module 20, distributed among multiple computers or other external resources 1042, or provided by computing resources (hardware and software) that are provided as a service over the network 1026, such as a cloud computing service.

The HMI 1040 is operatively coupled to the processor 84 of control module 20 in a known manner to allow a user to interact directly with the control module 20. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 84.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 84 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control system for a machine having variable rate damping based control, the machine including one or more active inceptors and one or more inline actuators, the control system comprising:
   one or more processors; and
   a memory coupled to the one or more processors, storing data comprising a database and program code that, when executed by the one or more processors, causes the control system to:
   receive an inceptor position from one or more active inceptors;
   combine, by a trim prediction model, one or more off-axis inputs, a rate error of the machine, and a total actuator position of the one or more inline actuators together to determine a change in position of a zero-force detent;
apply a rate limit to the change in position of the zero-force detent to determine a zero-force detent command;
calculate an operator command based on the inceptor position and the zero-force detent command;
determine an amplitude of the operator command, wherein the amplitude is a magnitude of the operator command;
determine a variable gain based on the amplitude of the operator command;
determine an actuation command based on the variable gain, wherein the total actuator position is a sum of the actuation command and the inceptor position; and
send the actuation command to the one or more inline actuators, wherein the one or more inline actuators actuate into the total actuator position to variably damp movement of the machine, and the machine is variably damped as a function of the magnitude of the operator command.

2. The control system of claim 1, wherein the one or more processors execute instructions to:
apply the amplitude of the operator command to a variable gain schedule, wherein the variable gain schedule includes a piecewise controller gain.

3. The control system of claim 2, wherein the piecewise controller gain includes:
a first subfunction that is equal to a maximum value of the variable gain;
a second subfunction that is a variable value ranging between the maximum value and a minimum value of the variable gain; and
a third subfunction that is equal to the minimum value of the variable gain.

4. The control system of claim 3, wherein the second subfunction of the piecewise controller gain defines an inversely proportional relationship between the amplitude of the operator command and the variable gain.

5. The control system of claim 1, wherein the one or more processors execute instructions to:
monitor the machine for a measured rate, wherein the measured rate represents an actual state of the machine;
compare the measured rate with a desired rate, wherein the desired rate is a value representing a requested pattern of movement of the machine; and
determine the rate error based on a difference between the measured rate and the desired rate.

6. The control system of claim 5, wherein the one or more processors execute instructions to:
receive a commanded rate and a trim rate, wherein the commanded rate is set to zero; and
combine the commanded rate with the trim rate to determine the desired rate.

7. The control system of claim 1, wherein the one or more processors execute instructions to:
determine the operator command based on a difference between the zero-force detent command and the inceptor position.

8. The control system of claim 1, wherein the rate limit represents a parameter limit value, and wherein the parameter limit value is configured to limit the rate of the zero-force detent command.

9. The control system of claim 1, wherein the one or more processors execute instructions to:
receive the one or more off-axis inputs;
derive an acceleration command component by applying the variable gain to a rate error;
mix the one or more off-axis inputs and the acceleration command component together; and
generate an unlimited actuator command based on mixing the one or more off-axis inputs and the acceleration command component together.

10. The control system of claim 9, wherein the one or more processors execute instructions to:
apply a control authority limit to the unlimited actuator command; and
determine a stability augmentation system command based on applying the control authority limit to the unlimited actuator command.

11. The control system of claim 10, wherein the one or more processors execute instructions to:
send the stability augmentation system command in combination with the inceptor position to the one or more inline actuators, wherein the one or more inline actuators move into the total actuator position in response to receiving the stability augmentation system command and the inceptor position.

12. The control system of claim 1, wherein a value of the variable gain decreases as the amplitude of the operator control input increases based on an inversely proportional relationship between the operator command and the variable gain.

13. A method for variably damping a machine by a control system having variable rate damping based control, the method comprising:
receiving, by a control module, an inceptor position from one or more active inceptors of the machine;
combining, by a trim prediction model, one or more off-axis inputs, a rate error of the machine, and a total actuator position of the one or more inline actuators together to determine a change in position of a zero-force detent;
applying a rate limit to the change in position of the zero-force detent to determine a zero-force detent command;
calculating, by the control module, an operator command based on the inceptor position and the zero-force detent command;
determining an amplitude of the operator command, wherein the amplitude is a magnitude of the operator command;
determining a variable gain based on the amplitude of the operator command;
determining an actuation command based on the variable gain, wherein a total actuator position is a sum of the actuation command and the inceptor position;
sending the actuation command to one or more inline actuators; and
actuating the one or more inline actuators into the total actuator position to variably damp movement of the machine, wherein the machine is variably damped as a function of the magnitude of the operator command.

14. The method of claim 13, further comprising:
applying the amplitude of the operator command to a variable gain schedule, wherein the variable gain schedule includes a piecewise controller gain.

15. The method of claim 14, wherein the piecewise controller gain includes:
a first subfunction that is equal to a maximum value of the variable gain;

a second subfunction that is a variable value ranging between the maximum value and a minimum value of the variable gain; and
a third subfunction that is equal to the minimum value of the variable gain.

16. The method of claim 13, further comprising:
monitoring the machine for a measured rate, wherein the measured rate represents an actual state of the machine;
comparing the measured rate with a desired rate, wherein the desired rate is a value representing a requested pattern of movement of the machine; and
determining the rate error based on a difference between the measured rate and the desired rate.

17. The method of claim 16, further comprising:
receiving a commanded rate and a trim rate, wherein the commanded rate is set to zero; and
combining the commanded rate with the trim rate to determine the desired rate.

18. The method of claim 13, further comprising:
determining the operator command based on a difference between the zero-force detent command and the inceptor position.

19. A control system for a machine having variable rate damping based control, the machine including one or more active inceptors and one or more inline actuators, the control system comprising:
one or more processors; and
a memory coupled to the one or more processors, storing data comprising a database and program code that, when executed by the one or more processors, causes the control system to:
receive an inceptor position from one or more active inceptors;
calculate an operator command based on at least the inceptor position;
determine an amplitude of the operator command, wherein the amplitude is a magnitude of the operator command;
determine a variable gain based on the amplitude of the operator command;
determine an actuation command based on the variable gain, wherein a total actuator position is a sum of the actuation command and the inceptor position;
send the actuation command to the one or more inline actuators, wherein the one or more inline actuators actuate into the total actuator position to variably damp movement of the machine, and the machine is variably damped as a function of the magnitude of the operator command;
monitor the machine for a measured rate, wherein the measured rate represents an actual state of the machine;
compare the measured rate with a desired rate, wherein the desired rate is a value representing a requested pattern of movement of the machine;
determine a rate error based on a difference between the measured rate and the desired rate;
receive, by a trim prediction model, one or more off-axis inputs, the rate error, and the total actuator position of the one or more inline actuators;
combine, by the trim prediction model, the one or more off-axis inputs, the rate error, and the total actuator position together; and
determine a change in position of a zero-force detent based on the trim prediction model combining the one or more off-axis inputs, the rate error, and the total actuator position together.

20. The control system of claim 19, wherein the one or more processors execute instructions to:
apply a rate limit to the change in position of the zero-force detent to determine a zero-force detent command; and
determine the operator command based on a difference between the zero-force detent command and the inceptor position.

21. The control system of claim 20, wherein the rate limit represents a parameter limit value, and wherein the parameter limit value is configured to limit the rate of the zero-force detent command.

22. A control system for a machine having variable rate damping based control, the machine including one or more active inceptors and one or more inline actuators, the control system comprising:
one or more processors; and
a memory coupled to the one or more processors, storing data comprising a database and program code that, when executed by the one or more processors, causes the control system to:
receive an inceptor position from one or more active inceptors;
calculate an operator command based on at least the inceptor position;
determine an amplitude of the operator command, wherein the amplitude is a magnitude of the operator command;
determine a variable gain based on the amplitude of the operator command;
determine an actuation command based on the variable gain, wherein a total actuator position is a sum of the actuation command and the inceptor position;
send the actuation command to the one or more inline actuators, wherein the one or more inline actuators actuate into the total actuator position to variably damp movement of the machine, and the machine is variably damped as a function of the magnitude of the operator command receive one or more off-axis inputs;
derive an acceleration command component by applying the variable gain to a rate error;
mix the one or more off-axis inputs and the acceleration command component together;
generate an unlimited actuator command based on mixing the one or more off-axis inputs and the acceleration command component together;
apply a control authority limit to the unlimited actuator command; and
determine a stability augmentation system command based on applying the control authority limit to the unlimited actuator command.

23. The control system of claim 22, wherein the one or more processors execute instructions to:
send the stability augmentation system command in combination with the inceptor position to the one or more inline actuators, wherein the one or more inline actuators move into the total actuator position in response to receiving the stability augmentation system command and the inceptor position.

24. A method for variably damping a machine by a control system having variable rate damping based control, the method comprising:
receiving, by a control module, an inceptor position from one or more active inceptors of the machine;
calculating, by the control module, an operator command based on at least the inceptor position;

determining an amplitude of the operator command, wherein the amplitude is a magnitude of the operator command;

determining a variable gain based on the amplitude of the operator command;

determining an actuation command based on the variable gain, wherein a total actuator position is a sum of the actuation command and the inceptor position;

sending the actuation command to one or more inline actuators; and actuating the one or more inline actuators into the total actuator position to variably damp movement of the machine, wherein the machine is variably damped as a function of the magnitude of the operator command;

monitoring the machine for a measured rate, wherein the measured rate represents an actual state of the machine;

comparing the measured rate with a desired rate, wherein the desired rate is a value representing a requested pattern of movement of the machine;

determining a rate error based on a difference between the measured rate and the desired rate;

receiving, by a trim prediction model, one or more off-axis inputs, the rate error, and the total actuator position of the one or more inline actuators;

combining, by the trim prediction model, the one or more off-axis inputs, the rate error, and the total actuator position together; and determining a change in position of a zero-force detent based on combining the one or more off-axis inputs, the rate error, and the total actuator position together.

25. The method of claim 24, further comprising:

applying a rate limit to the change in position of the zero-force detent to determine a zero-force detent command; and determining the operator command based on a difference between the zero-force detent command and the inceptor position.

* * * * *

UNITED STATES PATENT AND TRADEMARK OFFICE
CERTIFICATE OF CORRECTION

PATENT NO. : 10,908,560 B2
APPLICATION NO. : 16/298468
DATED : February 2, 2021
INVENTOR(S) : Joseph G. Irwin et al.

Page 1 of 1

It is certified that error appears in the above-identified patent and that said Letters Patent is hereby corrected as shown below:

In the Claims

At Column 18, Line 40, Claim 22 reads:
"command receive one or more off-axis inputs;"

Should read:
--command;
receive one or more off-axis inputs;--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*